United States Patent [19]

Marsden

[11] 4,004,343

[45] Jan. 25, 1977

[54] METHOD OF MAKING CORE TUBES FOR SOLENOIDS

[75] Inventor: John Thomas Marsden, Lower Tean, England

[73] Assignee: Expert Industrial Controls Limited, Lount, England

[22] Filed: Apr. 15, 1975

[21] Appl. No.: 568,263

[30] Foreign Application Priority Data

Apr. 18, 1974 United Kingdom ............. 16898/74

[52] U.S. Cl. ................................... 29/596; 29/418; 29/527.6; 29/607; 164/69; 164/108; 164/114; 228/169; 335/262

[51] Int. Cl.$^2$ .................. H02K 15/02; H01F 41/02

[58] Field of Search ............ 29/596, 602, 607, 608, 29/418, 527.5, 527.6; 164/108, 112, 69, 70, 114, 115–118; 228/168, 169, 256; 335/251, 258, 262; 310/42

[56] References Cited

UNITED STATES PATENTS

| | | | |
|---|---|---|---|
| 2,207,150 | 7/1940 | Hirsch et al. | 29/527.6 X |
| 2,860,403 | 11/1958 | Meyer | 29/607 |
| 3,022,450 | 2/1962 | Chase, Jr. | 29/607 X |
| 3,166,692 | 1/1965 | Forrester et al. | 335/251 |

*Primary Examiner*—Carl E. Hall

*Attorney, Agent, or Firm*—Kane, Dalsimer, Kane, Sullivan and Kurucz

[57] ABSTRACT

A method of forming the core tube of an electro-magnetic solenoid comprises forming and positioning the end portions of the core tube and centrifugally casting the non-magnetic intermediate portion of the core tube.

2 Claims, 4 Drawing Figures

METHOD OF MAKING CORE TUBES FOR SOLENOIDS

This invention relates to solenoids of the kind comprising a core tube within which is slidable an armature and a winding surrounding the core tube, opposite end portions of the core tube when the winding is energised being magnetically polarised so that movement of the armature within the core tube will occur.

It is desirable that the core tube should define a continuous internal surface and it is known to achieve this in a number of ways. One way is to form the core tube in three parts which are brazed or otherwise secured together, the intermediate part in this instance being formed from non-magnetic material. Another way is to form the tube from a single piece of special steel which is subsequently heat treated so that the intermediate portion of the tube is non-magnetic. Both these constructions pose manufacturing problems and the object of the present invention is to provide a method of manufacturing a core tube for a solenoid in a simple and convenient form. It is also an object of the invention to provide a solenoid employing the form of core tube.

According to the invention a method of manufacturing a core tube for a solenoid of the kind specified comprises forming the end portions of the core tube and centrifugally casting the non-magnetic intermediate portion of the tube.

According to another aspect of the invention, a method of manufacturing a core tube for a solenoid of the kind specified comprises machining a length of tube so as to form the end portions of the core tube and leaving an integral bridge between said end portions, said bridge being of thinner section so as to define a circumferential recess, centrifugally casting into said recess the non-magnetic intermediate portion of the core tube, and further machining the tube to remove said bridge.

According to a further feature of the invention, said recess is formed in the outer wall of the tube.

According to a further feature of the invention prior to the step of centrifugal casting a further tube is secured to the periphery of said first mentioned tube to provide an outer wall to said recess, said bridge being apertured to permit the liquid material which when hardened will constitute said non-magnetic insert, to flow into said recess, said further tube being removed after the step of centrifugal casting.

According to a further feature of the invention said length of tube is machined from a solid block of material, one end of said tube being left closed to define a baffle to prevent the liquid material falling through the tube during the step of centrifugal casting, the baffle being removed during a subsequent machining process.

The invention also resides in a solenoid embodying a core tube wherever manufactured as specified in the preceding paragraphs.

Figure 1:
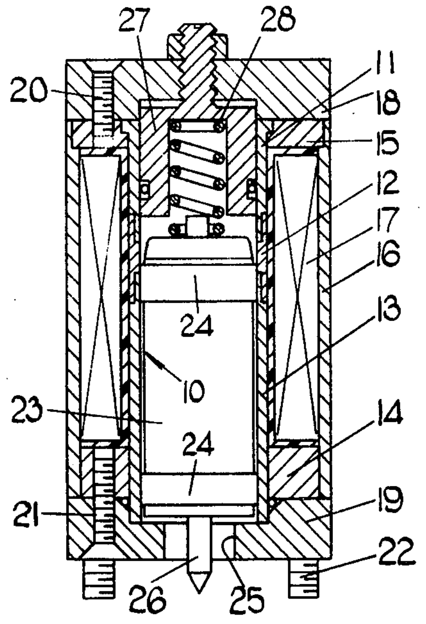
Figure 2:
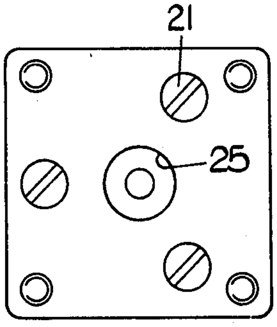
Figure 3:
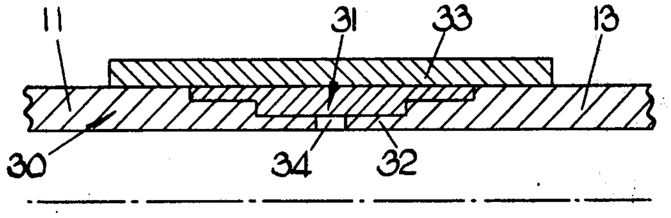
Figure 4:
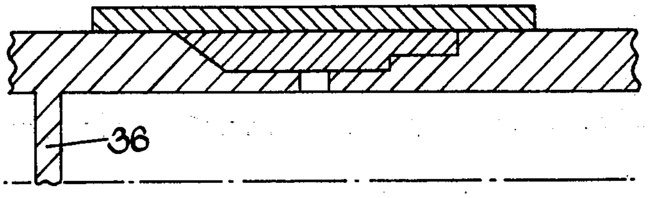

One example of a solenoid made in accordance with the invention will now be described with reference to the accompanying drawings, in which:

FIG. 1 is a sectional side elevation of one example of a proportional solenoid embodying the invention, FIG. 2 is an inverted plan view of the valve end of the solenoid shown in FIG. 1, and FIGS. 3 and 4 show examples of the core tube of the solenoid at one stage in the manufacture thereof.

Referring to FIG. 1 of the drawings, the solenoid includes a core tube 10 which is formed in three parts 11, 12 and 13. The sections 11 and 13 are formed from magnetisable material and each defines a right cylindrical inner surface. In addition, the outer surface is also of cylindrical form. The presented ends of the parts 11 and 13 are shaped, and the intermediate part 12 is formed by a centrifugal casting method. The material from which the part 12 is formed is non-magnetic material, and in the particular example is brass.

The solenoid also includes a pair of end washers 14, 15 which are formed from magnetisable material. The washer 14 surrounds the part 13 of the core tube and the washer 15 surrounds the part 11 of the core tube. In addition, the part 11 of the core tube is provided with a step on its periphery which locates within a complimentary recess in the washer 15. Surrounding the washers is a tubular yoke 16 and interposed between the yoke and the core tube is a winding 17 which is wound upon a former. End plates 18, 19 are provided, the end plate 18 being secured to the washer 15 by means of screws 20 and the end plate 19 being secured to the washer 14 by means of screws 21. The end plate 19 defines a step against which the end of the core tube bears, and the opposite end of the core tube bears against the end plate 18. Moreover, the end plate 19 is provided with apertures for the reception of screws 22 whereby the solenoid can be secured to a valve housing or the like.

Located within the core tube is an armature 23. The armature is of cylindrical form and has a diameter slightly smaller than that of the core tube. The armature however, is provided with a pair of spaced bearing rings 24 which are formed from a non-magnetic material such as bronze, stainless steel or synthetic resin material, and which guide the movement of the armature within the core tube. The end plate 19 is provided with an aperture 25 through which extends a rod 26 which is connected to the armature and which in the particular example, has its end shaped to form the movable part of a control valve.

Located within the core tube and surrounded by the part 11 thereof is an adjustable plug 27 which may be formed from magnetisable or non-magnetisable material. The plug is adjustable from the exterior of the solenoid and is provided with a blind recess in which is located a coiled compression spring 28. The compression spring acts between the base wall of the recess and the armature 23.

When the winding 17 is energised the armature 23 will move against the action of the spring 28 towards the adjacent end face of the plug.

In the particular example, it is desired that the force stroke curve of the combination of the solenoid and armature should be horizontal and to ensure that this occurs, the end portion of the armature adjacent the plug 27 is of tapered truncated form. As an alternative to tapering the armature in this fashion, the end portion of the part 11 of the core tube may be suitably shaped, or in some circumstances, it may be desirable to shape the part 11 of the core tube and also the armature.

The plug 27 is provided with a peripheral groove in which is located a seal member whereby the space in which the armature can move, can be sealed from the exterior of the solenoid. Moreover, a sealing ring is provided in a recess defined in the end plate 19, the sealing ring engaging the periphery of the core tube and also the washer 14. In this manner, fluid leakage from the associated valve housing by way of the solenoid will be prevented.

The method to be described, of casting the non-magnetic insert is particularly useful where it is desired to shape the part 11 of the core tube since it would be expensive to machine the intermediate portion of the tube as suggested earlier to provide the required fit before the two parts are secured together. Moreover, using the second method suggested it would be very difficult to heat treat the tube to provide the equivalent of a profile.

In one method of forming the core tube the two parts 11 and 13 after machining are mounted in the correct relationship within a surrounding mould surface and their presented end portions are first heated using an induction heating process, to a temperature at which the brass will form the desired bond. The two components are then spun at for instance 1000 RPM, and molten brass is poured into the tube. Centrifugal force throws the molten brass into the space defined between the presented end portions of the two parts and the surrounding mould surface. Rotation of the two parts is continued until the brass freezes whereafter the tube is removed from the mould and its exterior surface machined. If desired the mould surface may be defined by an extension on one of the parts which fits over the other part and which is removed in the machining process.

In another method of constructing the core tube, the core tube is formed by first machining a tube indicated at 30 in FIG. 3, the machining comprising forming a shaped circumferential recess 31 in the outer periphery of the tube. The side walls of the recess 31 are shaped so that the presented ends of the parts 11 and 12 when the core tube is constructed, will have the desired shape and section. The base wall 32 of the recess after the initial machining process, forms an integral bridge between the two parts. Moreover, the base wall is apertured at 34 for a purpose to be explained. Following the machining of the recess a further tube 33 is assembled over the outside of the tube 30 to define an outer wall for the recess 31.

The tube 33 is fixed to the tube 30 so as to define a liquid tight seal therewith. Conveniently the tube 33 is welded to the tube 30. The assembly is then ready for the centrifugal casting of brass into the recess. For this purpose the assembly is rotated about the longitudinal axis of the tube 30 conveniently with this axis disposed vertically. A plug is provided for the lower end of the tube 30 and preheating of the tube in the region of the recess can be arranged using induction heating. The molten brass is then poured into the tube and passes through the apertures 34 into the recess so that the recess is completely filled with brass. When the assembly has cooled further machining can be carried out both internally and externally to remove the bridge 32 and the further tube 33. The core tube is then ready for assembly into the solenoid.

If desired instead of starting with a preformed tube, the equivalent of the tube may be machined from solid material and in this case a baffle 35 FIG. 4, may be left in the tube to one side of the recess, the baffle acting to prevent the brass flowing out of the lower and adjacent end of the tube, during the casting process.

If the presented end portions of the parts 11 and 13 are substantially flat and if the diameter of the tube is such that the recess can be machined in the internal periphery of the tube 30 then the bridge will constitute the outer wall of the recess and there will be no need for the further tube.

The forms of construction described are particularly useful when it is desired to construct a so called proportional solenoid. That is to say a solenoid in which the armature displacement is proportional to the current flowing in the solenoid winding. In this type of solenoid it is desirable that the shape of the force/stroke curve should be capable of alteration to suit different applications. It is therefore necessary to be able to form accurately the presented end faces of the parts 11 and 13 of the core tube and the methods described enable this to be done. Moreover, in particular the methods described utilizing the bridge enable the parts 11 and 13 to be held in the correct relationship during the casting process.

It will be appreciated that the form of core tube described may be used with solenoids having a differing construction to that described. For example the outer periphery of the core tube may be of plain cylindrical form with the plug secured therein as by welding. The winding assembly can be detachably mounted about the core tube and retained in position by means of a retaining nut engageable with a stud carried by the plug.

I claim:

1. A method of manufacturing a core tube having a non-magnetic intermediate portion for an electro-magnetic solenoid comprising; machining a length of tube so as to form the end portions of the core tube and leaving an integral bridge between said end portions, said bridge being of thinner section so as to define a circumferential recess, centrifugally casting into said recess the non-magnetic intermediate portion of the core tube, and further machining the tube to remove said bridge, said recess being formed in the outer wall of said tube; securing a further tube to the periphery of the first mentioned tube, said further tube providing an outer wall to said recess, said bridge being apertured to permit the liquid material which when hardened will constitute said non-magnetic insert, to flow into said recess, said further tube being removed after the step of centrifugal casting.

2. A method as claimed in claim 1 in which said length of tube is machined from a solid block of material, one end of said tube being left closed to define a baffle to prevent the liquid material flowing through the tube during the step of centrifugal casting, the baffle being removed during a subsequent machining process.

* * * * *